United States Patent
Gowdar

(10) Patent No.: US 12,070,877 B2
(45) Date of Patent: Aug. 27, 2024

(54) COMPOSITE MATERIAL PALLET ASSEMBLY FORMED FROM RECYCLED MATERIAL

(71) Applicant: REGEN-COMPOSITES INTERNATIONAL CORP., Winnipeg (CA)

(72) Inventor: Prakash Gowdar, Winnipeg (CA)

(*) Notice: Subject to any disclaimer, the term of this patent is extended or adjusted under 35 U.S.C. 154(b) by 750 days.

(21) Appl. No.: 17/047,294

(22) PCT Filed: Apr. 11, 2019

(86) PCT No.: PCT/CA2019/050442
§ 371 (c)(1),
(2) Date: Oct. 13, 2020

(87) PCT Pub. No.: WO2019/195939
PCT Pub. Date: Oct. 17, 2019

(65) Prior Publication Data
US 2021/0146577 A1 May 20, 2021

Related U.S. Application Data
(60) Provisional application No. 62/655,993, filed on Apr. 11, 2018.

(51) Int. Cl.
*B29B 17/00* (2006.01)
*B29B 17/04* (2006.01)
(Continued)

(52) U.S. Cl.
CPC ...... *B29B 17/0026* (2013.01); *B29B 17/0412* (2013.01); *B65D 19/0095* (2013.01); *B29K 2101/12* (2013.01); *B29K 2105/26* (2013.01); *B29L 2031/7178* (2013.01); *B65D 2519/00019* (2013.01); *B65D 2519/00029* (2013.01); *B65D 2519/00034* (2013.01); *B65D 2519/00039* (2013.01); *B65D 2519/00044* (2013.01); *B65D 2519/00104* (2013.01); *B65D 2519/00109* (2013.01); *B65D 2519/00273* (2013.01);
(Continued)

(58) Field of Classification Search
CPC ........... B29B 17/0026; B29B 17/0412; B65D 19/0095; B29K 2101/12; B29K 2105/26; B29L 2031/7178
See application file for complete search history.

(56) References Cited

U.S. PATENT DOCUMENTS 5,960,721 A * 10/1999 Huetteman ........ B65D 19/0095
108/57.17
8,627,773 B2 * 1/2014 Storteboom ........... B65D 19/38
108/51.11

(Continued)

*Primary Examiner* — Daniel J Rohrhoff
(74) *Attorney, Agent, or Firm* — Ryan W. Dupuis; Kyle R. Satterthwaite; Ade & Company Inc.

(57) ABSTRACT

A pallet is formed in which one or more components thereof is formed of a composite material. The composite material includes mass particles consisting of a fibrous material derived at least in part from recycled post-consumer materials and a binding material consisting of a thermoplastic material derived at least in part from recycled post-consumer materials. The mass particles and the binding material are mixed such that the binding material is liquified and each mass particle is fully encapsulated by the liquified binding material.

18 Claims, 3 Drawing Sheets

(51) Int. Cl.
*B29K 101/12* (2006.01)
*B29K 105/26* (2006.01)
*B29L 31/00* (2006.01)
*B65D 19/00* (2006.01)

(52) U.S. Cl.
CPC .............. *B65D 2519/00293* (2013.01); *B65D 2519/00323* (2013.01); *B65D 2519/00333* (2013.01); *B65D 2519/00373* (2013.01); *B65D 2519/00562* (2013.01)

(56) References Cited

U.S. PATENT DOCUMENTS

| | | | |
|---|---|---|---|
| 8,985,034 B2* | 3/2015 | Dummett | B29C 48/52 |
| | | | 108/161 |
| 10,604,299 B1* | 3/2020 | Soehnlen | B65D 19/0024 |
| 2008/0128933 A1* | 6/2008 | Przybylinski | B29B 7/728 |
| | | | 264/31 |
| 2013/0237633 A1 | 9/2013 | Tamir | |
| 2014/0221553 A1* | 8/2014 | Van Riemsdijk | B29C 48/40 |
| | | | 524/508 |
| 2018/0237633 A1* | 8/2018 | Takemura | C08L 61/14 |

* cited by examiner

COMPOSITE MATERIAL PALLET ASSEMBLY FORMED FROM RECYCLED MATERIAL

This application claims priority benefits from U.S. provisional application Ser. No. 62/655,993, filed Apr. 11, 2018.

FIELD OF THE INVENTION

The present invention relates to a pallet assembly formed using composite materials, and more particularly a pallet assembly using composite material components that are formed from recycled materials.

BACKGROUND

Pallets are a twentieth century invention designed to support goods in a stable fashion while being lifted by a forklift, pallet jack, front loader, work saver, or other jacking device, or a crane. A pallet may allow for the transportation and storage of a wide variety of products and may allow for those goods to be moved within storage facilities and to and from transport vehicles, such as trucks, trains and ships.

A typical wooden pallet may support a maximum of 1,500 kilograms of stacked product and is used in the transportation of goods globally. Standards exist for the transportation of goods across national boundaries to minimize the importation of foreign material, more specifically insects and plant life. The rapid deforestation across the globe and the growth of landfills in urban areas has caused an increase need for reusing discarded wood products, plastic, nylon and fibreglass.

A conventional wooden pallet will typically be designed for either one time use or to be used for a several cycles before it is discarded or repaired for reuse. This may results in additional scrap materials for which there is limited storage.

Pallets made from plastic or metal may be stronger and may have an increased lifespan, however they can be costly to manufacture and can be heavier in weight. A heavier pallet can result in a significant increase in the cost to ship goods.

SUMMARY OF THE INVENTION

According to one aspect of the invention there is provided a pallet assembly comprising:

a pallet frame having a width spanning in a lateral direction between opposing sides of the pallet assembly, a length spanning in a longitudinal direction perpendicularly to the lateral direction between opposing ends of the pallet assembly, an upper deck frame defining a top of the pallet frame, a lower deck frame defining a bottom of the pallet frame, and a spacer frame supporting the upper deck frame spaced above the lower deck frame;

the upper deck including two upper lead boards extending across the width of the pallet frame at the ends of the pallet frame and a plurality of cross members extending across the width of the pallet frame in between the upper lead boards;

the spacer frame including a plurality of spacer members spanning a full height between the upper deck and the lower deck;

at least one of the lead boards or the spacer members consisting of a composite material;

the composite material comprising:

a plurality of mass particles occupying between 35% and 60% by weight of the composite material;

the mass particles consisting of a fibrous material at least partially derived from recycled post-consumer materials;

the mass particles having an average particle size in the range of 1 to 50 millimeters;

a binding material occupying between 40% and 60% by weight of the composite material;

the binding material consisting of a thermoplastic material at least partially derived from recycled post-consumer materials; and each mass particle being substantially fully encapsulated by the binding material.

As set out above, a conventional wooden pallet will typically be designed for either one time use or to be used for a several cycles before it is discarded or repaired for reuse while potentially stronger pallets made from materials such as plastic or metal may have longer lifespans but be can costly to manufacture and can be heavier in weight.

In one aspect, there is provided a pallet including pallet components formed of materials produced from one or more post-consumer waste materials. For example, the components may be formed from 100% waste material such as, for example, nylon, fibreglass, various types of plastic and/or wood.

A pallet formed using pallet assembly components formed in whole or in part from processed post-consumer waste materials may have greatly increased durability and/or strength as compared to a conventional wooden pallet. Conveniently, a more durable and/or stronger pallet may require fewer repairs.

Additionally or alternatively, it may be that such a pallet has competitive cost. It may, for example, be that the cost is comparable to traditional wood pallets.

Additionally or alternatively, it may be that such a pallet, such as, for example, by reason of its method of manufacture and/or the materials used, has the effect of reducing landfill waste, sequester carbon, reduce methane gas and to reduce deforestation.

Additionally or alternatively, a pallet including pallet assembly components formed of processed post-consumer waste materials may have a greatly increased useful life and/or may require fewer repairs.

Additionally or alternatively, it may be that a pallet including pallet assembly components formed of processed post-consumer waste materials can be reprocessed such as, for example, into a new pallet.

Additionally or alternatively, a pallet including pallet assembly components formed of processed post-consumer waste materials may cost less per use cycle than conventional pallets.

Other aspects and features of the present application will be understood by those of ordinary skill in the art from a review of the foregoing and following description in conjunction with the accompanying figures.

A method of forming a composite component in a pallet assembly comprising a pallet frame having a width spanning in a lateral direction between opposing sides of the pallet assembly, a length spanning in a longitudinal direction perpendicularly to the lateral direction between opposing ends of the pallet assembly, an upper deck frame defining a top of the pallet frame, a lower deck frame defining a bottom of the pallet frame, and a spacer frame including spacer members supporting the upper deck frame spaced above the lower deck frame, in which the upper deck includes two upper lead boards extending across the width of the pallet frame at the ends of the pallet frame and a plurality of cross members extending across the width of the pallet frame in between the upper lead boards, and in which at least one of the lead boards or the spacer members consists of the composite component, the method comprising:

deriving a plurality of mass particles consisting of a fibrous material at least in part from recycled post-consumer materials such that the mass particles have an average particle size in the range of 1 to 50 millimeters;

deriving a binding material consisting of a thermoplastic material at least in part from recycled post-consumer materials;

mixing the mass particles and the binding material such that the mass particles occupy between 35% and 60% by weight of the composite component and the binding material occupies between 40% and 60% by weight of the composite component;

heating the binding material before or during mixing such that the binding material is substantially liquified and each mass particle is substantially fully encapsulated by the liquified binding material;

pressing the encapsulated mass particles together to form a block of material; and shaping the block of material to form the composite component.

The method may further include shaping the block of material to form the composite component by cutting the block of material to produce cuttings, and mixing the cuttings with the mass particles and the binding material in the formation of a second composite component.

In some instances, the method may include directly forming the composite component after mixing while the binding material remains heated; however, in other instances, the method may alternatively include, before forming the block, cooling the encapsulated mass particles, transporting the encapsulated mass particles to a secondary manufacturing location, heating the encapsulated mass particles at the secondary manufacturing location, and pressing the encapsulated mass particles to form the block of material and shaping the block of material to form the composite component at the secondary manufacturing location.

The binding material may be heated during the mixing such that the binding material undergoes partial pyrolysis. More preferably, the binding material is heated such that the binding material undergoes 50% of full pyrolysis.

According to all aspects of the invention, the composite material is preferably substantially non-porous.

Preferably, any voids in the composite material are smaller in size that the average particle size of the mass particles.

In some instances, an average thickness of the encapsulating binding material about the mass particles is less than the average particle size of the mass particles.

In some embodiments, the binding material may have a pyrolysis temperature which is lower than a pyrolysis temperature of the mass particles.

The mass particles may (i) consist only of particles formed of cellulose fibres, (ii) consist only of particles formed of synthetic fibres, or (iii) consist of particles formed of both synthetic fibres and cellulose fibres.

Preferably, the composite material has a density in a range of 0.75 to 0.95 grams per cubic centimeter.

Preferably, the composite material has a compressive strength which is greater than 1500 psi, and more preferably which is greater than 2000 psi.

Preferably one or both of the mass particles and the binding material are fully (100%) derived from recycled post-consumer materials.

The composite material may incorporate organic waste derived from the recycled post-consumer materials in which the organic waste occupies less than 3% by weight of the composite material.

BRIEF DESCRIPTION OF THE DRAWINGS

Embodiments of the invention will now be described in conjunction with the accompanying drawings in which.

In the drawings like characters of reference indicate corresponding parts in the different figures.

DETAILED DESCRIPTION

Figure 1:
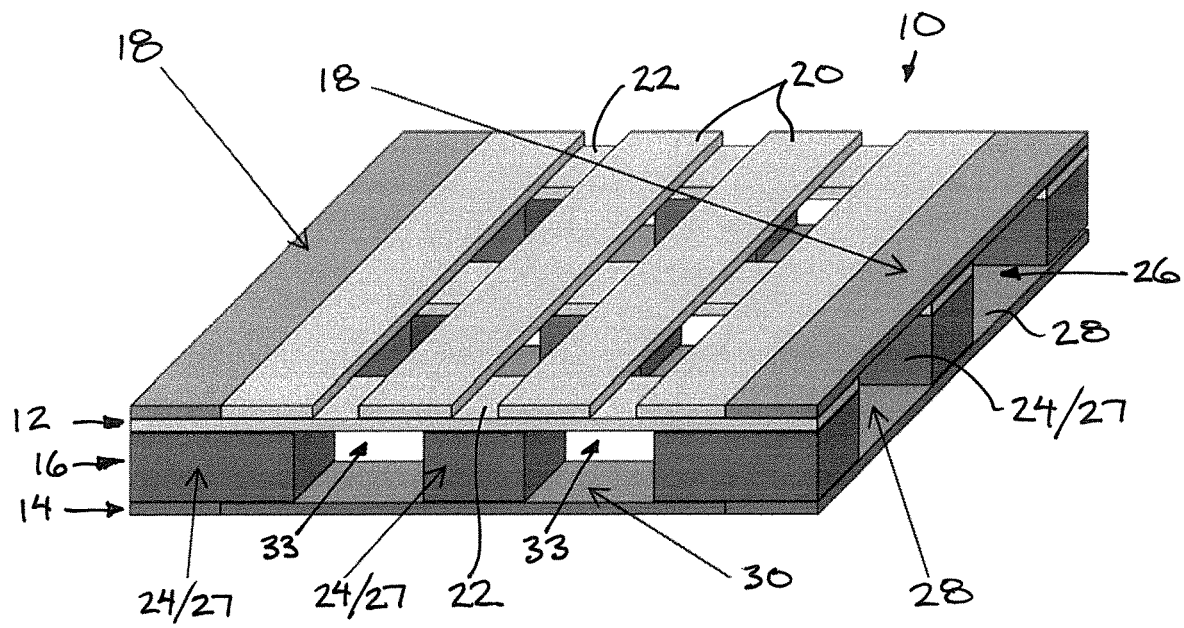
FIG. 1 is a perspective view of a first embodiment of the pallet assembly.

Referring to the accompanying figures, the present invention relates to a pallet assembly and a method of manufacturing composite components for use in forming the pallet assembly.

Although various embodiments of the pallet assembly are shown in the accompanying figures, in each instance the pallet assembly comprises a pallet frame 10 having a width spanning in a lateral direction between opposing sides of the pallet frame and a length spanning in a longitudinal direction perpendicularly to the lateral direction between opposing ends of the pallet frame. The width and length are typically standardized dimensions such that the width may be 40 inches for example and the length may be 48 inches for example.

The pallet frame 10 generally includes an upper deck 12 defining a top of the pallet frame, a lower deck 14 defining a bottom of the pallet frame, and a spacer frame 16 spanning a full height between the upper deck and the lower deck so as to support the upper deck spaced above the lower deck for defining the overall height of the pallet frame.

The upper deck in each embodiment includes two upper lead boards 18 at the top side of the pallet frame and at opposing ends of the pallet frame respectively such that each upper lead board 18 spans the full width of the pallet frame in the lateral direction. The upper deck also includes a plurality of upper cross members 20 at longitudinally spaced apart positions relative to one another between the upper lead boards 18 so as to be in a common plane therewith. Each upper cross member 20 similarly spans across the full width of the pallet frame in the lateral direction.

In the first embodiment of FIG. 1, the upper deck 12 further includes a plurality of connecting members 22 extending in the longitudinal direction so as to span the full length of the deck frame. The connecting members extend along both sides of the pallet frame with a third connecting member being laterally centred between the connecting members at the sides of the pallet frame. Each of the connecting members 22 passes directly beneath and is rigidly connected to each one of the upper cross members 20 and the upper lead boards 18 at the perpendicular junctions thereof.

In the second embodiment of FIG. 2, the upper deck 12 consists only of the upper cross members 20 and the lead boards 18 for direct connection to components of the spacer frame 16 as described in further detail below.

In each instance the spacer frame 16 comprises a plurality of spacer members 24 which each span a full height between the lower deck therebelow and the upper deck thereabove. The spacer members 24 are arranged in three longitudinally extending rows such that one row is provided at each of the laterally opposing sides of the pallet frame and a third row is provided at a laterally centred location between the sides. Two apertures 26 are effectively defined between the longitudinally extending rows of spacer members 24 in which each of the apertures 26 spans the full length of the pallet frame in the longitudinal direction with the apertures 26 being laterally spaced apart by a suitable distance for alignment with the lift forks of a conventional forklift in the usual manner of a pallet.

In the first embodiment of FIG. 1, each spacer member comprises a rectangular block 27 in which a set of three blocks forms each of the rows of the spacer frame. More particularly each row of the spacer frame includes two end blocks at longitudinally opposed ends of the pallet frame having a sufficient length in the longitudinal direction to span the width of a respective one of the lead boards and an adjacent one of the upper cross members of the upper deck frame. The third block 27 within each row is longitudinally centred relative to the two end blocks.

Figure 2:
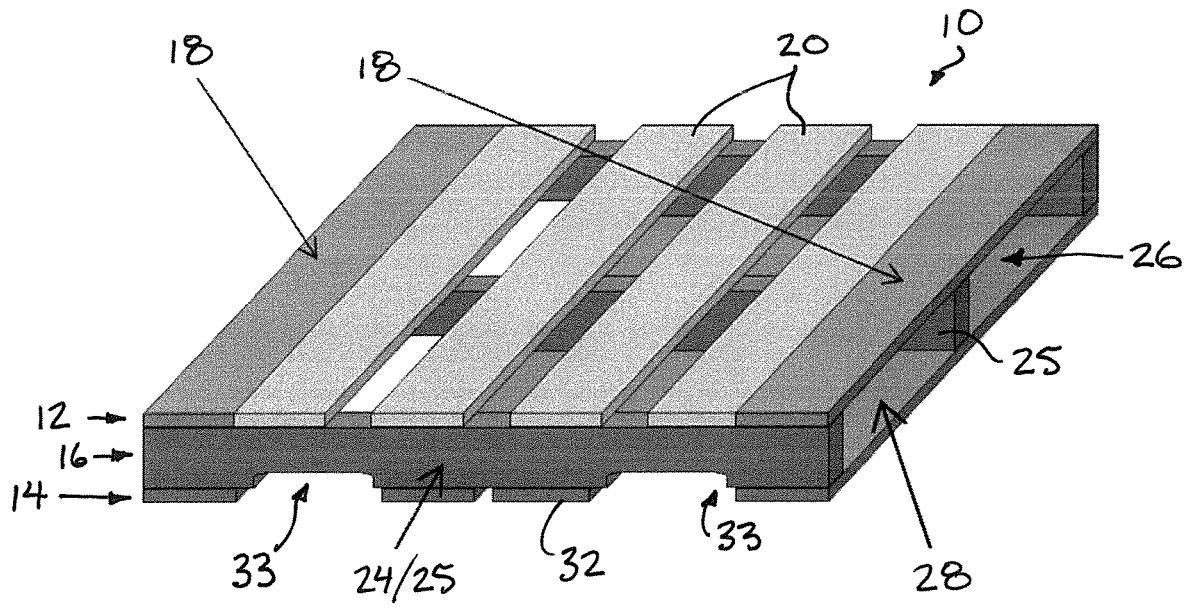
FIG. 2 is a perspective view of a first embodiment of the pallet assembly.
Figure 3:
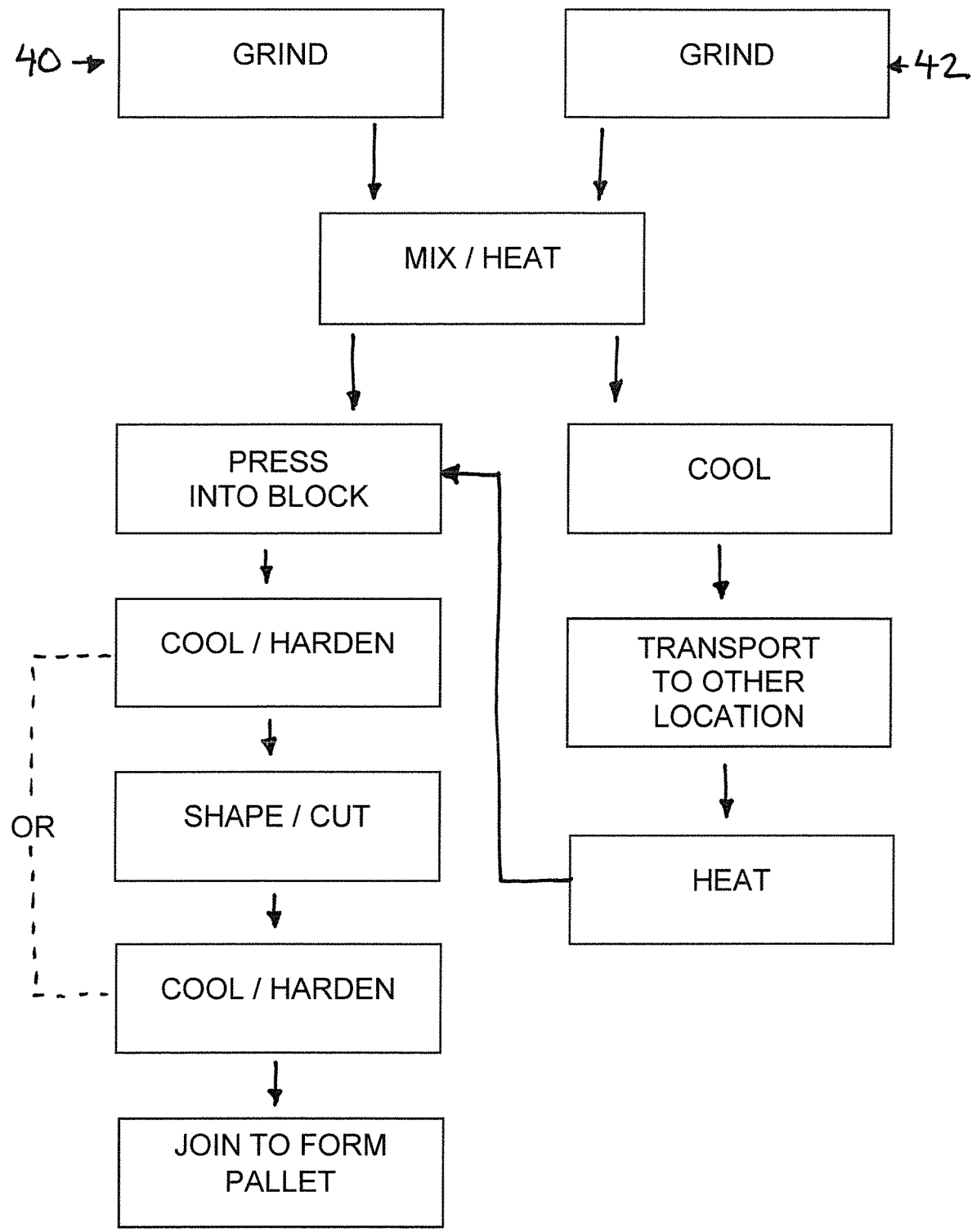
FIG. 3 is a flow chart illustrating a manufacturing process for manufacturing the pallet assembly of composite material formed from post-consumer waste material.

In the second embodiment of FIG. 2, each spacer member 24 comprises a stringer 25 which spans the full length of the pallet frame in the longitudinal direction such that each stringer 25 defines a single respective row of the spacer frame as described above. The apertures 26 are thus each defined between an adjacent pair of the stringers 25.

The lower deck 14 in each embodiment includes two lower lead boards 28 at the bottom side of the pallet frame and at opposing ends of the pallet frame respectively such that each lower lead board 28 spans the full width of the pallet frame in the lateral direction.

In the first embodiment of FIG. 1, the lower deck 14 further includes a set of three intermediate members 30 which align with the three longitudinal rows of the spacer frame 16 such that each intermediate member 30 extends in the longitudinal direction along a full length between the two lower lead boards 28 with which the opposing ends of the intermediate members 30 abut. The intermediate members 30 lie in a common plane with the lower lead boards while being oriented perpendicularly to the lower lead boards. Each intermediate member 30 is secured below a respective one of the central blocks 27 such that opposing ends of the intermediate member are secured below respective ones of the end blocks 27 within the same row as the respective central block. A pair of cross apertures 33 are defined wholly within the spacer frame to span laterally across the width of the pallet frame. Each cross aperture 33 is defined within the longitudinal gap between the end blocks 27 at one end of the pallet frame and the central blocks 27. The cross apertures 33 provide an alternative location for receiving the forks of pallet handling equipment such as a forklift if desired.

In the second embodiment of FIG. 2, the lower deck 14 further includes a plurality of lower cross members 32 at longitudinally spaced apart positions relative to the lower lead boards with which the lower cross members lie in a common plane. Each lower cross member spans across the full width of the pallet frame in the lateral direction. The two lower cross members 32 are positioned in close proximity to one another at a longitudinally central location such that the gap between each lower cross member 32 and the corresponding lower lead board 28 defines a respective one of the two cross apertures 33 defined within the pallet frame according to FIG. 2. At the location of each cross aperture 33, each stringer 25 of the spacer frame may include an upwardly recessed cavity along the bottom edge thereof such that the height of the cross apertures are defined by the thickness of the lower deck frame together with the height of the recesses in the bottom of the stringers.

In each embodiment, at least some of the components of the pallet frame described above comprise composite components formed of composite material according to the present invention.

In preferred embodiments, all components of the lower deck 14 comprise composite components, including the lower lead boards 28 and either of the intermediate member 30 or the lower cross members 32.

In addition, in preferred embodiments, some or all of the components of the spacer frame 16 comprise composite components, including the stringers 25 or the blocks 27. The connecting members 22, if provided, may be formed of conventional wood lumber or may comprise composite components.

Furthermore, in preferred embodiments, at least the upper lead boards 18 comprised composite components while the upper lead boards 18 may be formed of a conventional wood lumber or may comprise composite components.

The composite components are manufactured primarily using two main components comprising (i) mass particles 40 defining a reinforcing material which is typically fibrous in structure, and (ii) a binding material 42 consisting of thermoplastic materials which are used to encapsulate the mass particles 40 and bind the mass particles relative to one another to define the composite material which forms each composite component. Typically, the mass particles 40 and the binding material 42 are derived at least partially, or more preferably entirely from recycled post-consumer waste materials.

The mass particles 40 may be formed of a material comprising cellulose fibers or synthetic fibers or a combination thereof. Suitable reinforcing material to form the mass particles include (i) wood derived from commercial, industrial construction, demolition, renovation, and the like, (ii) paper derived from waste paper, newsprint, shredded office paper, cardboard, and the like, (iii) textiles such as clothing, fabric, weaves, carpets, stuffing, upholstery and the like, (iv) fiberglass including insulation, fiberglass strands of various types, fiberglass pieces, and the like, (v) forestry by-products including diseased trees, branches, sawdust, and the like, and (vi) agricultural derived products including straw, flax shives, hemp, and the like.

The binding material 42 is a thermoplastic material which is capable of being melted or liquefied under application of heat for coating and encapsulating the mass particles 40. Suitable binding materials include (i) polyethylene terephthalate including water and pop bottles, fleece garments, carpets, upholstery stuffing and the like, (ii) high density polyethylene including milk jugs, laundry detergent bottles, shampoo bottles, toys and the like, (iii) polyvinylchloride including oil containers, toys, drainpipes, hoses, window and door frames, and the like, (iv) low density polyethylene including food wrap, dry cleaner bags, bread bags, squeeze bottles, and the like, (v) polypropylene including disposable diapers, plastic bottle tops, yogurt containers, straws and the like, (vi) polystyrene including plastic cutlery, coffee cup lids, take-out containers, egg cartons, and the like, but excluding expanded polystyrene such as Styrofoam®, and (vii) other types of thermoplastics including acrylic, polycarbonate, polylactic fibers, nylon, bisphenol a, baby bottles, sippy cups, and the like.

The mass particles 40 are typically prepared by initially providing a recycled product, for example formed of wood, followed by breaking up of the product into smaller particles by various means including cutting, chipping, grinding and the like in order to reduce the recycled product into a plurality of mass particles having an average particle size in the range of 1 to 50 millimetres across. The mass particles 40 may include much smaller particles presented as a fine dust as a result of the mechanical process of reducing the size of the particles. In some embodiments, the mass particles may consist only of a fine dust; however, it is preferred that the average particle size be in the range of ⅜ to ½ of an inch in diameter, with some particles being greater than half an inch in size. Mass particles are dried so as to have a moisture content of less than 10%.

The thermoplastic material defining the binding material 42 is also prepared by initially providing a recycled product followed by breaking up of the product into smaller particles by various means including cutting, chipping, grinding and the like in order to reduce the recycled product into a plurality of smaller particles also having an average particle size in the range of 1 to 50 millimeters across. The particle size of the binding material is less critical as the binding material is intended to be liquefied under heat in subsequent stages; however, a particle size which is similar to the particle size of the mass particles 40 provides for more even distribution of the binding material 42 relative to the mass particles 40 during initial mixing. The binding material 42 is typically dried to a moisture content of less than 2% prior to mixing with the mass particles.

Once the mass particles 40 and the binding material 42 have been suitably prepared, the particles can be mixed together with one another in a suitable mixer such as a batch mixer or a continuous flow mixer feeding an extruder for example. The mixture within the mixer for forming the composite components typically consists of mass particles 40 in the range of 35% to 60% by weight of the finished composite material and binding material 42 in the range of 40% to 65% by weight of the finished composite material.

A small amount of garbage waste material can be incorporated into the composite material forming the composite components, such as organic waste accompanying some of the post-consumer material from which the mass particles or the binding material was derived. This organic waste material may occupy up to 3% by weight of the finished composite material.

The materials described above are uniformly distributed throughout the mixing vessel by mixing in a manner that causes heating of the mixture, for example by providing an external heating input.

In preferred embodiments, the average pyrolysis temperature of the binding materials is less than the average pyrolysis temperature of the mass particles so as to enable heating the mixture to a degree which causes the binding materials 42 to undergo partial pyrolysis, preferably near 50% of full pyrolysis without the mass particles undergoing any substantial degree of pyrolysis to maintain the structure of the mass particles.

Figure 4:
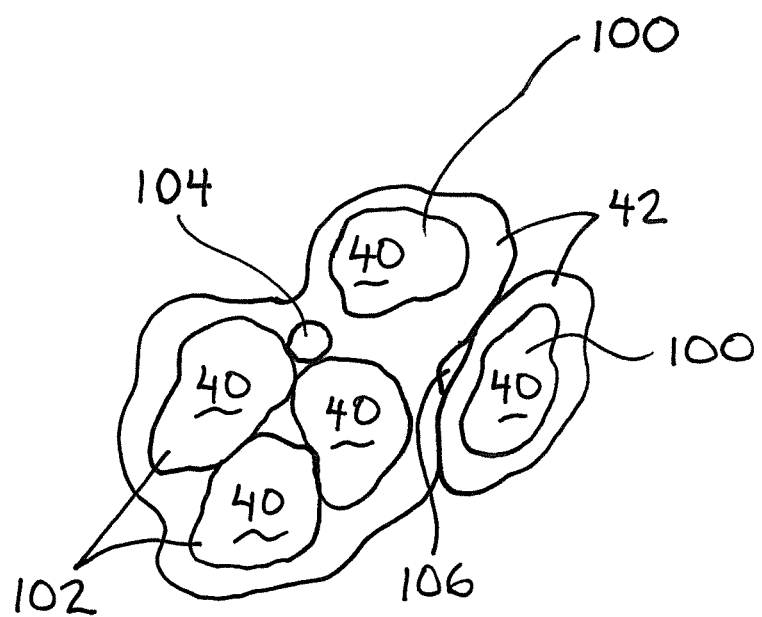
FIG. 4 is a schematic representation of the composition of the composite material.

The heating of the mixture of mass particles 40 and the binding material 42 is sufficient to cause all of the binding material 42 to be melted and substantially liquefied so as to fully coat and encapsulate each of the mass particles by either coating each individual particle 100 or by fully coating an agglomeration of two or more agglomerated particles 102 as shown in FIG. 4. The liquefied binding material 42 enables the mass particles 40 to be bonded relative to one another once the binding material has cooled to a hardened state.

Any waste particles 104, derived from the organic waste for example, can be similarly encapsulated and fully contained within the matrix of binding material in the completed composite component so as to have minimal or no detrimental effects to the structural properties of the completed composite component.

The completed composite component may also include some voids 106 however, when forming the composite components, the composite material is typically sufficiently compressed to minimize the size of the voids such that the average dimension of the voids tends to be much smaller than the average particle size of the mass particles 40. Furthermore, the average thickness of the encapsulating binding material about the mass particles is less than the average particle size of the mass particles. The completed composite component is typically formed of material which has been sufficiently compressed that the composite material is substantially nonporous having a density in the range of 0.75 to 0.95 g/cm$^3$. This results in the composite material having a compressive strength which is typically greater than 1500 psi, and more preferably greater than 2000 psi.

Once a raw composite material has been prepared subsequent to the mixing and heating stage, the raw composite material may be placed directly into suitable forms using a press or may be pressed into shape using an extruder for example to immediately form a complete block of material. The block of material may directly correspond to the dimensions of a composite component of the pallet frame or alternatively, the block of material which is formed by pressing the raw composite material can be further shaped by cutting and the like after removal from a suitable form.

Additional cutting or shaping of the material of various forms can occur prior to the block of material being fully cooled and hardened, or subsequent to cooling and hardening of the block. In either instance, where cutting of the block of material to reduce the size into a finished composite component occurs which results in formation of cuttings, the cuttings are typically collected and then added to a subsequent batch mixture for forming additional composite components.

Once a cooled and hardened composite component has been formed, the composite component can then be mounted at the appropriate location within the pallet frame using various fasteners or adhesive and the like for securement to other components.

In an alternative arrangement, the raw composite material resulting from the heating and mixing stage can be allowed to cool for storage or for transport to a second manufacturing location. This raw composite material effectively comprises a plurality of mass particles which have been fully encapsulated by the binding material 42 but which have not yet been pressed and formed into a block of material having the desired density of the finished composite component. This raw composite material can be used at a second manufacturing location to form the composite component by reheating and pressing the raw composite material into a suitable form with a press or a screw extruder for example to form the block of material described above which can then be shaped, for example by cutting either before or after the block of material has fully cooled and hardened. Again, any cuttings collected from a cutting process can be recycled back into the mixer for mixing with a subsequent batch of mass particles and binding material.

As described above, FIG. 1 presents an example pallet according to the subject matter of the present application in which the example pallet is a block pallet. The example pallet is formed of a variety of components including boards, blocks, and bottom deck boards, in which one or more of the boards, the blocks and the bottom deck board may be formed of suitably-processed post-consumer waste material, such as, for example, one or more of post-consumer nylon, fiberglass, wood and/or plastic, as further described herein.

Also as described above, FIG. 2 presents a second example pallet in which the example pallet is a stringer pallet. One or more of the lead boards, the stringers and the bottom deck boards may be formed of suitably-processed post-consumer waste material, such as, for example, one or more of post-consumer nylon, fiberglass, wood and/or plastic, as further described herein.

As mentioned above, components of the pallets may constructed of processed post-consumer waste material and, possibly, 100% post-consumer waste material.

The post-consumer waste material from which the invention is comprised can be constructed from nylon, fiberglass, plastic and wood waste material.

The particular post-consumer waste materials used in forming pallet components may influence its properties. In one example, the use of nylon post-consumer waste material in forming pallet components may provide chemical resistance, strength, and/or superior thermal resistance. In another example, the use of post-consumer fiberglass material may increase the strength of pallet components and/or may provide corrosion resistance for components in which it used.

The post-consumer waste material may be collected, reduced in size by grinding the material into small particles and reconstituted through a process involving the application of heat and/or pressure to bind the material into the necessary form.

The pallet assembly components may be shaped and cut into the required size prior to cooling and the components may be allowed time to cool and harden prior to forming part of the pallet assembly.

The pallet assembly components may be affixed to the pallet component parts with the use of adhesives, nails or staples.

Forming pallet component parts of post-consumer waste material may reduce the need to have post-consumer waste material transported to landfills or incinerators. Conveniently, in this way, pollution and/or green house gas emissions may be reduced. Additionally or alternatively, use of virgin materials may be reduced. the effect of reducing landfill waste, sequester carbon, reduce methane gas and to reduce deforestation.

It may be that pallets including components formed of post-consumer waste are recyclable and can be used in the creation of new pallet assemblies (i.e. they may be "re-recycled").

It may be that pallets including components formed of post-consumer waste are resistant to insect and plant infestation.

Additionally or alternatively, such a pallet may be resistant to mold and rot. Additionally or alternatively, such a pallet may comply with the International Standards For Phytosanitary Measures No. 15 (ISPM 15).

Pallet components formed of post-consumer waste material may be more economical and/or may cost less than components constructed from plastic or metal and/or those cut from wood.

Forming pallet components from post-consumer waste material instead of wood may reduce the risk of deforestation.

A pallet including components formed of post-consumer waste may have an increased lifespan as compared to, for example, a conventional wooden pallet.

Pallet components formed of post-consumer waste may be heat resistant. Heat resistance may reduce the risk and size of damage such as may result from being in the vicinity of combustible material.

Pallet components formed of post-consumer waste such as, for example, a pallet block and/or pallet stringer, may readily accept nails, screws and other fasteners. Additionally or alternatively, they may provide greater holding power than can result by fastening wood components together. Furthermore, it may be that any nailing pattern can be used and nails can be applied to all sides if required.

Pallet components formed of post-consumer waste may be designed and constructed so as to be recyclable to make new products.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

As noted, certain adaptations and modifications of the described embodiments can be made. Therefore, the above-discussed embodiments are considered to be illustrative and not restrictive.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method of forming a composite component in a pallet assembly comprising a pallet frame having a width spanning in a lateral direction between opposing sides of the pallet assembly, a length spanning in a longitudinal direction perpendicularly to the lateral direction between opposing ends of the pallet assembly, an upper deck frame defining a top of the pallet frame, a lower deck frame defining a bottom of the pallet frame, and a spacer frame including spacer members supporting the upper deck frame spaced above the lower deck frame, in which the upper deck frame includes two upper lead boards extending across the width of the pallet frame at the ends of the pallet frame and a plurality of cross members extending across the width of the pallet frame in between the upper lead boards, and in which at least one of the lead boards or the spacer members consists of the composite component, the method comprising:

deriving a plurality of mass particles consisting of a fibrous material at least in part from recycled post-consumer materials such that the mass particles have an average particle size in the range of 1 to 50 millimeters;

deriving a binding material consisting of a thermoplastic material at least in part from recycled post-consumer materials;

mixing the mass particles and the binding material such that the mass particles occupy between 35% and 60% by weight of the composite component and the binding material occupies between 40% and 60% by weight of the composite component;
heating the binding material before or during mixing such that the binding material is substantially liquified and each mass particle is substantially fully encapsulated by the liquified binding material;
pressing the encapsulated mass particles together to form a block of material; and
shaping the block of material to form the composite component by cutting the block of material to produce cuttings, and mixing the cuttings with the mass particles and the binding material in the formation of a second composite component.

2. A method of forming a composite component in a pallet assembly comprising a pallet frame having a width spanning in a lateral direction between opposing sides of the pallet assembly, a length spanning in a longitudinal direction perpendicularly to the lateral direction between opposing ends of the pallet assembly, an upper deck frame defining a top of the pallet frame, a lower deck frame defining a bottom of the pallet frame, and a spacer frame including spacer members supporting the upper deck frame spaced above the lower deck frame, in which the upper deck frame includes two upper lead boards extending across the width of the pallet frame at the ends of the pallet frame and a plurality of cross members extending across the width of the pallet frame in between the upper lead boards, and in which at least one of the lead boards or the spacer members consists of the composite component, the method comprising:
deriving a plurality of mass particles consisting of a fibrous material at least in part from recycled post-consumer materials such that the mass particles have an average particle size in the range of 1 to 50 millimeters;
deriving a binding material consisting of a thermoplastic material at least in part from recycled post-consumer materials;
mixing the mass particles and the binding material such that the mass particles occupy between 35% and 60% by weight of the composite component and the binding material occupies between 40% and 60% by weight of the composite component;
heating the binding material before or during mixing such that the binding material is substantially liquified and each mass particle is substantially fully encapsulated by the liquified binding material;
cooling the encapsulated mass particles;
transporting the encapsulated mass particles to a secondary manufacturing location;
heating the encapsulated mass particles at the secondary manufacturing location;
and pressing the encapsulated mass particles to form a block of material and shaping the block of material to form the composite component at the secondary manufacturing location.

3. A method of forming a composite component in a pallet assembly comprising a pallet frame having a width spanning in a lateral direction between opposing sides of the pallet assembly, a length spanning in a longitudinal direction perpendicularly to the lateral direction between opposing ends of the pallet assembly, an upper deck frame defining a top of the pallet frame, a lower deck frame defining a bottom of the pallet frame, and a spacer frame including spacer members supporting the upper deck frame spaced above the lower deck frame, in which the upper deck frame includes two upper lead boards extending across the width of the pallet frame at the ends of the pallet frame and a plurality of cross members extending across the width of the pallet frame in between the upper lead boards, and in which at least one of the lead boards or the spacer members consists of the composite component, the method comprising:
deriving a plurality of mass particles consisting of a fibrous material at least in part from recycled post-consumer materials such that the mass particles have an average particle size in the range of 1 to 50 millimeters;
deriving a binding material consisting of a thermoplastic material at least in part from recycled post-consumer materials;
mixing the mass particles and the binding material such that the mass particles occupy between 35% and 60% by weight of the composite component and the binding material occupies between 40% and 60% by weight of the composite component;
heating the binding material during the mixing such that the binding material undergoes partial pyrolysis and such that the binding material is substantially liquified and each mass particle is substantially fully encapsulated by the liquified binding material;
pressing the encapsulated mass particles together to form a block of material; and
shaping the block of material to form the composite component.

4. The method according to claim 3 including heating the binding material such that the binding material undergoes 50% of full pyrolysis.

5. A method of forming a composite component in a pallet assembly comprising a pallet frame having a width spanning in a lateral direction between opposing sides of the pallet assembly, a length spanning in a longitudinal direction perpendicularly to the lateral direction between opposing ends of the pallet assembly, an upper deck frame defining a top of the pallet frame, a lower deck frame defining a bottom of the pallet frame, and a spacer frame including spacer members supporting the upper deck frame spaced above the lower deck frame, in which the upper deck frame includes two upper lead boards extending across the width of the pallet frame at the ends of the pallet frame and a plurality of cross members extending across the width of the pallet frame in between the upper lead boards, and in which at least one of the lead boards or the spacer members consists of the composite component, the method comprising:
deriving a plurality of mass particles consisting of a fibrous material at least in part from recycled post-consumer materials such that the mass particles have an average particle size in the range of 1 to 50 millimeters;
deriving a binding material consisting of a thermoplastic material at least in part from recycled post-consumer materials;
mixing the mass particles and the binding material such that the mass particles occupy between 35% and 60% by weight of the composite component and the binding material occupies between 40% and 60% by weight of the composite component;
heating the binding material before or during mixing such that the binding material is substantially liquified and each mass particle is substantially fully encapsulated by the liquified binding material;
pressing the encapsulated mass particles together to form a block of material; and
shaping the block of material to form the composite component;
wherein the composite component is substantially non-porous.

6. The method according to claim 5 including directly forming the composite component after mixing while the binding material remains heated.

7. The method according to claim 5 wherein the mass particles consist of particles formed of both synthetic fibres and cellulose fibres.

8. The method according to claim 5 wherein the mass particles consist only of particles formed of synthetic fibres.

9. The method according to claim 5 wherein the composite component has a density in a range of 0.75 to 0.95 grams per cubic centimeter.

10. The method according to claim 5 wherein the composite component has a compressive strength which is greater than 1500 psi.

11. The method according to claim 5 wherein the composite component has a compressive strength which is greater than 2000 psi.

12. The method according to claim 5 wherein the composite component incorporates organic waste derived from the recycled post-consumer materials in which the organic waste occupies less than 3% by weight of the composite material.

13. The method according to claim 5 wherein the mass particles are fully derived from recycled post-consumer materials.

14. The method according to claim 5 wherein the binding material fully derived from recycled post-consumer materials.

15. A method of forming a composite component in a pallet assembly comprising a pallet frame having a width spanning in a lateral direction between opposing sides of the pallet assembly, a length spanning in a longitudinal direction perpendicularly to the lateral direction between opposing ends of the pallet assembly, an upper deck frame defining a top of the pallet frame, a lower deck frame defining a bottom of the pallet frame, and a spacer frame including spacer members supporting the upper deck frame spaced above the lower deck frame, in which the upper deck frame includes two upper lead boards extending across the width of the pallet frame at the ends of the pallet frame and a plurality of cross members extending across the width of the pallet frame in between the upper lead boards, and in which at least one of the lead boards or the spacer members consists of the composite component, the method comprising:
- deriving a plurality of mass particles consisting of a fibrous material at least in part from recycled post-consumer materials such that the mass particles have an average particle size in the range of 1 to 50 millimeters;
- deriving a binding material consisting of a thermoplastic material at least in part from recycled post-consumer materials;
- mixing the mass particles and the binding material such that the mass particles occupy between 35% and 60% by weight of the composite component and the binding material occupies between 40% and 60% by weight of the composite component;
- heating the binding material before or during mixing such that the binding material is substantially liquified and each mass particle is substantially fully encapsulated by the liquified binding material;
- pressing the encapsulated mass particles together to form a block of material; and
- shaping the block of material to form the composite component;
- wherein any voids in the composite component are smaller in size that the average particle size of the mass particles.

16. A method of forming a composite component in a pallet assembly comprising a pallet frame having a width spanning in a lateral direction between opposing sides of the pallet assembly, a length spanning in a longitudinal direction perpendicularly to the lateral direction between opposing ends of the pallet assembly, an upper deck frame defining a top of the pallet frame, a lower deck frame defining a bottom of the pallet frame, and a spacer frame including spacer members supporting the upper deck frame spaced above the lower deck frame, in which the upper deck frame includes two upper lead boards extending across the width of the pallet frame at the ends of the pallet frame and a plurality of cross members extending across the width of the pallet frame in between the upper lead boards, and in which at least one of the lead boards or the spacer members consists of the composite component, the method comprising:
- deriving a plurality of mass particles consisting of a fibrous material at least in part from recycled post-consumer materials such that the mass particles have an average particle size in the range of 1 to 50 millimeters;
- deriving a binding material consisting of a thermoplastic material at least in part from recycled post-consumer materials;
- mixing the mass particles and the binding material such that the mass particles occupy between 35% and 60% by weight of the composite component and the binding material occupies between 40% and 60% by weight of the composite component;
- heating the binding material before or during mixing such that the binding material is substantially liquified and each mass particle is substantially fully encapsulated by the liquified binding material;
- pressing the encapsulated mass particles together to form a block of material; and
- shaping the block of material to form the composite component;
- wherein an average thickness of the encapsulating binding material about the mass particles is less than the average particle size of the mass particles.

17. A method of forming a composite component in a pallet assembly comprising a pallet frame having a width spanning in a lateral direction between opposing sides of the pallet assembly, a length spanning in a longitudinal direction perpendicularly to the lateral direction between opposing ends of the pallet assembly, an upper deck frame defining a top of the pallet frame, a lower deck frame defining a bottom of the pallet frame, and a spacer frame including spacer members supporting the upper deck frame spaced above the lower deck frame, in which the upper deck frame includes two upper lead boards extending across the width of the pallet frame at the ends of the pallet frame and a plurality of cross members extending across the width of the pallet frame in between the upper lead boards, and in which at least one of the lead boards or the spacer members consists of the composite component, the method comprising:
- deriving a plurality of mass particles consisting of a fibrous material at least in part from recycled post-consumer materials such that the mass particles have an average particle size in the range of 1 to 50 millimeters;
- deriving a binding material consisting of a thermoplastic material at least in part from recycled post-consumer materials;
- mixing the mass particles and the binding material such that the mass particles occupy between 35% and 60% by weight of the composite component and the binding material occupies between 40% and 60% by weight of the composite component;

heating the binding material before or during mixing such that the binding material is substantially liquified and each mass particle is substantially fully encapsulated by the liquified binding material;

pressing the encapsulated mass particles together to form a block of material; and shaping the block of material to form the composite component;

wherein the mass particles consist only of particles formed of cellulose fibres.

18. A method of forming a composite component in a pallet assembly comprising a pallet frame having a width spanning in a lateral direction between opposing sides of the pallet assembly, a length spanning in a longitudinal direction perpendicularly to the lateral direction between opposing ends of the pallet assembly, an upper deck frame defining a top of the pallet frame, a lower deck frame defining a bottom of the pallet frame, and a spacer frame including spacer members supporting the upper deck frame spaced above the lower deck frame, in which the upper deck frame includes two upper lead boards extending across the width of the pallet frame at the ends of the pallet frame and a plurality of cross members extending across the width of the pallet frame in between the upper lead boards, and in which at least one of the lead boards or the spacer members consists of the composite component, the method comprising:

deriving a plurality of mass particles consisting of a fibrous material at least in part from recycled post-consumer materials such that the mass particles have an average particle size in the range of 1 to 50 millimeters;

deriving a binding material consisting of a thermoplastic material at least in part from recycled post-consumer materials;

mixing the mass particles and the binding material such that the mass particles occupy between 35% and 60% by weight of the composite component and the binding material occupies between 40% and 60% by weight of the composite component;

heating the binding material before or during mixing such that the binding material is substantially liquified and each mass particle is substantially fully encapsulated by the liquified binding material;

pressing the encapsulated mass particles together to form a block of material; and shaping the block of material to form the composite component;

wherein the composite material is substantially non-porous;

wherein any voids in the composite material are smaller in size that the average particle size of the mass particles;

wherein an average thickness of the encapsulating binding material about the mass particles is less than the average particle size of the mass particles;

wherein the binding material has a pyrolysis temperature which is lower than a pyrolysis temperature of the mass particles; and wherein the composite material has a density in a range of 0.75 to 0.95 grams per cubic centimeter.

* * * * *